(12) United States Patent
Matsumoto et al.

(10) Patent No.: US 8,080,733 B2
(45) Date of Patent: Dec. 20, 2011

(54) ELECTRONIC APPARATUS

(75) Inventors: Yasuo Matsumoto, Ome (JP); Toshio Konno, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/904,019

(22) Filed: Oct. 13, 2010

(65) Prior Publication Data

US 2011/0155411 A1 Jun. 30, 2011

(30) Foreign Application Priority Data

Dec. 25, 2009 (JP) ................... 2009-295634

(51) Int. Cl.
*H05K 5/02* (2006.01)

(52) U.S. Cl. .............. 174/51; 174/50; 174/520; 174/59; 361/679.41; 361/679.02; 361/730

(58) Field of Classification Search ............ 174/50, 174/51, 17 R, 520, 535, 559, 561, 562, 59; 361/600, 601, 679.02, 679.01, 679.09, 679.26, 361/730, 732, 740, 741, 747, 752, 759, 796, 361/799, 801, 679.41, 679.57; 220/3.2, 3.9, 220/4.02; 439/535, 949
See application file for complete search history.

(56) References Cited

U.S. PATENT DOCUMENTS

| | | | | |
|---|---|---|---|---|
| 5,461,546 A | * | 10/1995 | Kobayashi et al. | ............ 361/796 |
| 6,697,252 B2 | * | 2/2004 | Maeda | ..................... 361/679.41 |
| 6,982,702 B1 | * | 1/2006 | Frame | ..................... 361/679.41 |
| 7,110,252 B2 | * | 9/2006 | Liang et al. | ............... 361/679.57 |
| 7,342,782 B2 | * | 3/2008 | Lam et al. | ..................... 174/50 |
| 7,426,108 B2 | * | 9/2008 | Carnevali | .................. 361/679.41 |

FOREIGN PATENT DOCUMENTS

| | | |
|---|---|---|
| JP | U 59-195675 | 12/1984 |
| JP | U 64-55669 | 4/1989 |
| JP | 08-124607 A | 5/1996 |
| JP | 8-181476 | 7/1996 |
| JP | 8-293335 | 11/1996 |
| JP | 8-293337 | 11/1996 |

* cited by examiner

*Primary Examiner* — Angel R Estrada

(74) *Attorney, Agent, or Firm* — Knobbe, Martens, Olson & Bear, LLP

(57) ABSTRACT

According to one embodiment, an electronic apparatus includes a casing, an attachment portion, a first projecting portion, a second projecting portion and a conductive member. The casing has an outer wall, an inner surface of which is provided with a first conductive layer. The attachment portion is provided on the inner surface of the outer wall, provided with an opening which is open to an outside of the outer wall and includes a bridging portion bridging the opening. The first projecting portion projects from the attachment portion in a position apart from the opening. The second projecting portion, projecting from the attachment portion, is located between the opening and the first projecting portion and provided with a second conductive layer electrically connected to the first conductive layer. The conductive member is attached to the attachment portion, and has a first portion elastically brought into contact with the second conductive layer.

10 Claims, 8 Drawing Sheets

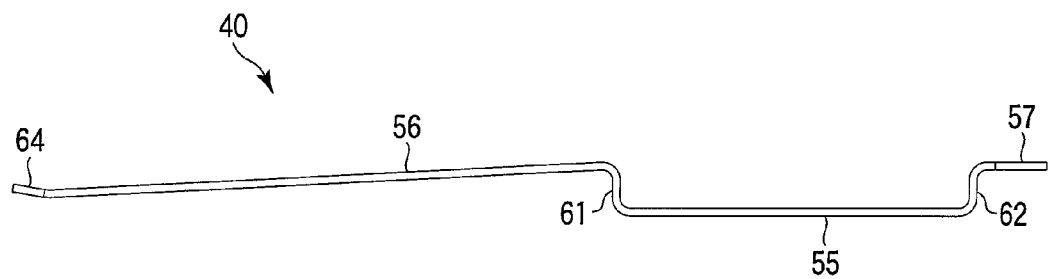
F I G. 7

ELECTRONIC APPARATUS

CROSS-REFERENCE TO RELATED APPLICATIONS

This application is based upon and claims the benefit of priority from Japanese Patent Application No. 2009-295634, filed Dec. 25, 2009; the entire contents of which are incorporated herein by reference.

FIELD

Embodiments described herein relate generally to an electronic apparatus comprising a conductive member for grounding, which is exposed out of a casing.

BACKGROUND

Electronic apparatuses, such as portable computers, may be connected to external apparatuses for function extension. The external apparatuses may be, for example, port replicators, docking stations or the like. An external apparatus comprises a ground electrode. The ground electrode projects from a surface on which the portable computer is mounted. The portable computer comprises a conductive member to be connected to this electrode.

A shield layer made of copper plating or the like is formed on an inner surface of the casing of the portable computer. The shield layer prevents an electromagnetic wave generated by circuit parts or the like in the casing from passing through and leaking out of the casing. Further, the shield layer prevents an external electromagnetic wave from adversely affecting the circuit parts in the casing.

The conductive member is electrically connected to the shield layer in the casing. The conductive member is connected to the ground electrode provided in the external apparatus. As a result, the potential of the shield layer of the portable computer becomes equivalent to that of the electrode of the external apparatus.

A leaf spring is used as the conductive member so that the conductive member is stably connected to the shield layer. Preferably, the leaf spring should easily be attached to the casing.

Jpn. Pat. Appln. KOKAI Publication No. 8-293335 discloses a ground spring attachment structure, in which a ball-shaped projection and a wedge-shaped bump portion are provided on a conductive body. The ground spring is provided with two holes respectively corresponding to the ball-shaped projection and the wedge-shaped bump portion. Utilizing the elasticity of the ground spring, the ball-shaped projection and the wedge-shaped bump portion are respectively fit in the two holes of the ground spring. Accordingly the ground spring is attached to the conductive body. Thus, the ground spring is easily attached to the conductive body without secondary working, such as screwing.

On the other hand, as described above, the electrode of the external apparatus is connected to the conductive member of the portable computer. To prevent the conductive member from deviating from a predetermined position or being removed by external force, the conductive member should desirably be firmly connected to the casing.

To firmly connect the conductive member to the casing, the conductive member may be provided with a positioning hole and the casing may be provided with a positioning pin, which is inserted through the hole. The conductive member and the casing are welded by melting the pin.

If the conductive member and the casing are welded by melting the positioning pin, the conductive member is firmly fixed to the casing. However, since the number of processes is increased by the melting of the pin, the time and cost for the production is increased.

From a different viewpoint, the portable computer is decomposed after discarded. Resources such as metals contained are recovered from the parts of the decomposed portable computer. However, if the conductive member is welded to the casing by melting the positioning pin, the conductive member made of a metal cannot be easily removed from the casing made of a synthetic resin.

To easily remove the conductive member, the ground spring attachment structure described above may be adopted. In the ground spring attachment structure, a ground spring for electrically connecting a pair of conductive members facing each other is attached to one of the conductive members. The ground spring attachment structure is not intended for the conductive member having a part exposed out of the casing.

Further, the conductive member connected to the electrode of the external apparatus includes a part which is exposed out of the casing and a part which is electrically connected to the shield layer inside the casing. The part exposed out of the casing has a short length for aesthetic purposes. The part connected to the shield layer inside the casing has a long length to assure the adhesion to the shield layer. The ground spring attachment structure is not intended for the conductive member having such a shape. Therefore, the ground spring attachment structure cannot be easily applied directly to the conductive member, which is connected to the electrode of the external apparatus.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

FIG. 7 is an exemplary side view showing a ground spring shown in FIG. 3;

DETAILED DESCRIPTION

Various embodiments will be described hereinafter with reference to the accompanying drawings.

In general, according to one embodiment, an electronic apparatus includes a casing, an attachment portion, a first projecting portion, a second projecting portion and a conductive member. The casing has an outer wall, an inner surface of which is provided with a first conductive layer. The attachment portion is provided on the inner surface of the outer wall, provided with an opening which is open to an outside of the outer wall and includes a bridging portion bridging the opening. The first projecting portion projects from the attachment portion in a position apart from the opening. The second projecting portion, projecting from the attachment portion, is located between the opening and the first projecting portion and provided with a second conductive layer electrically connected to the first conductive layer. The conductive member is attached to the attachment portion, and has a first portion elastically brought into contact with the second conductive layer.

An embodiment will be described with reference to FIGS. 1 to 9. This specification defines a near side (or the user side) as the front, a far side from the user as the rear, a left side viewed from the user as the left, a right side viewed from the user as the right, an upside viewed from the user as up, and a down side viewed from the user as down.

Figure 1:
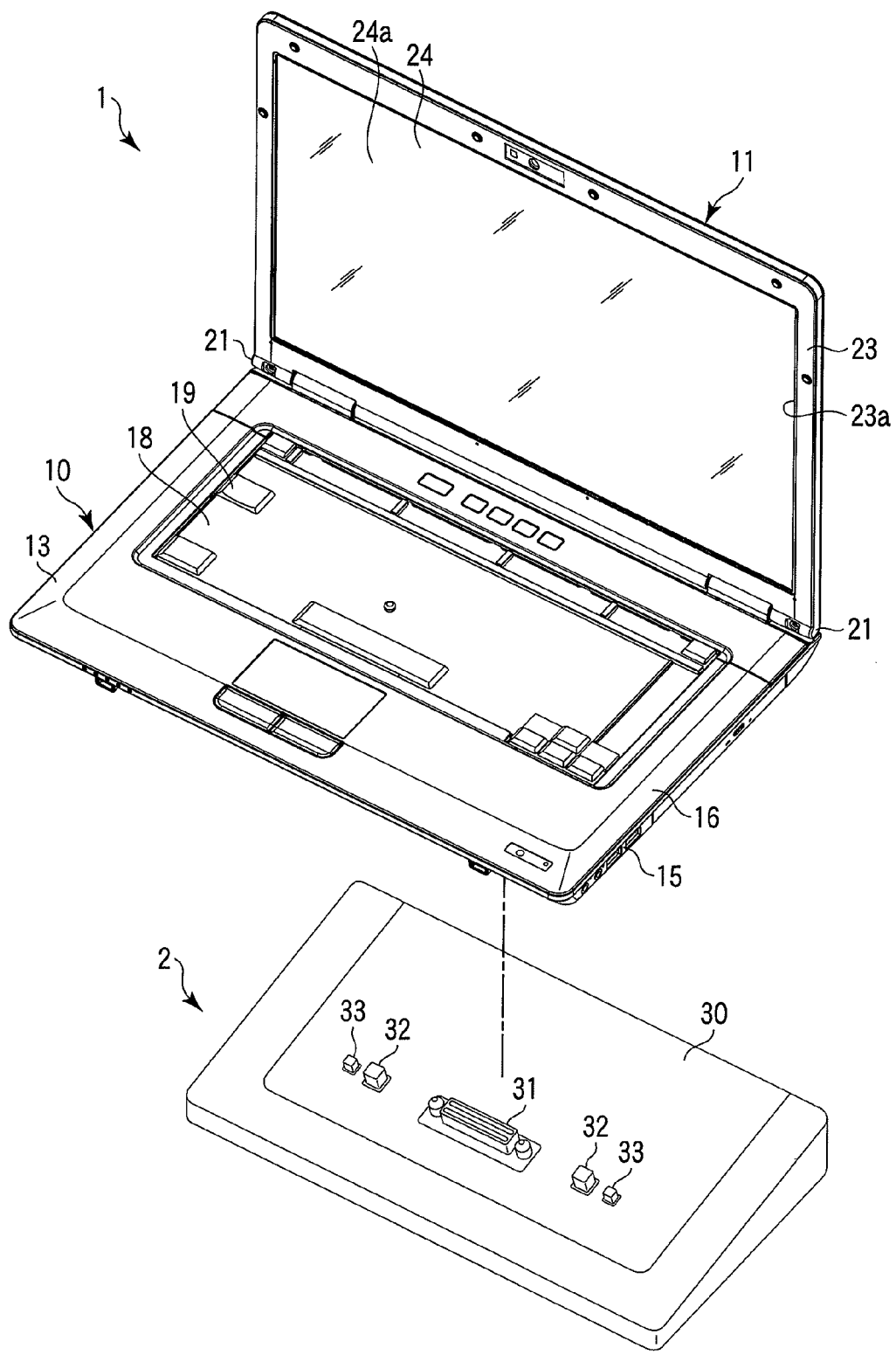
FIG. 1 is an exemplary perspective view showing a portable computer and a port replicator according to an embodiment.

FIG. 1 shows a portable computer 1 and a port replicator 2. The portable computer 1 is an example of an electronic apparatus. The port replicator 2 is an example of an external apparatus. As shown in FIG. 1, the portable computer 1 comprises a computer main body 10 and a display unit 11.

The computer main body 10 comprises a flat box-shaped main casing 13. The main casing 13 is an example of a casing. The main casing 13 comprises a rear cover 15 and a top cover 16 which is overlaid from above the rear cover 15. The rear cover 15 is an example of an outer wall. A keyboard attachment portion 18 is provided on an upper surface of the top cover 16. A keyboard 19 is supported by the keyboard attachment portion 18.

The display unit 11 is connected to a rear end of the computer main body 10 via a pair of hinge portions 21. The display unit 11 is rotatable about the hinge portions 21 between an open position and a closed position. In the closed position, the display unit 11 lies over the computer main body 10. In the open position, the display unit 11 stands from the rear end of the computer main body 10.

The display unit 11 comprises a flat box-shaped display casing 23 and a display module 24 contained in the display casing 23. The display module 24 is, for example, a liquid crystal display. The display casing 23 is provided with a display opening 23a in the front surface thereof. The display opening 23a causes a screen 24a of the display module 24 to expose out of the display unit 11.

The port replicator 2 shown in FIG. 1 is an external apparatus for function extension, to which the portable computer 1 is connected. The port replicator 2 comprises a mount surface 30, a plug 31, a pair of eject pins 32, and a pair of ground electrodes 33. The pair of eject pins 32 is an example of a push portion.

The mount surface 30 faces the rear cover 15 of the main casing 13. When the portable computer 1 is connected to the port replicator 2, the mount surface 30 supports the main casing 13.

The plug 31, the pair of eject pins 32 and the pair of ground electrodes 33 project from the mount surface 30. The plug 31 is a terminal to connect the portable computer 1 and the port replicator 2.

The pair of eject pins 32 can be retracted inside the port replicator 2. When the portable computer 1 is connected to the port replicator 2, the eject pins 32 are pushed by the computer main body 10 and retracted into the inside of the port replicator 2. When the portable computer 1 is disconnected from the port replicator 2, the eject pins 32 push up the main casing 13 from the mount surface 30 by operation of the user.

The pair of ground electrodes 33 can be retracted inside the port replicator 2. When the portable computer 1 is connected to the port replicator 2, the ground electrodes 33 are pushed by the computer main body 10 and retracted into the inside of the port replicator 2. The ground electrodes 33 are electrically connected to wires provided in the port replicator 2.

Figure 2:
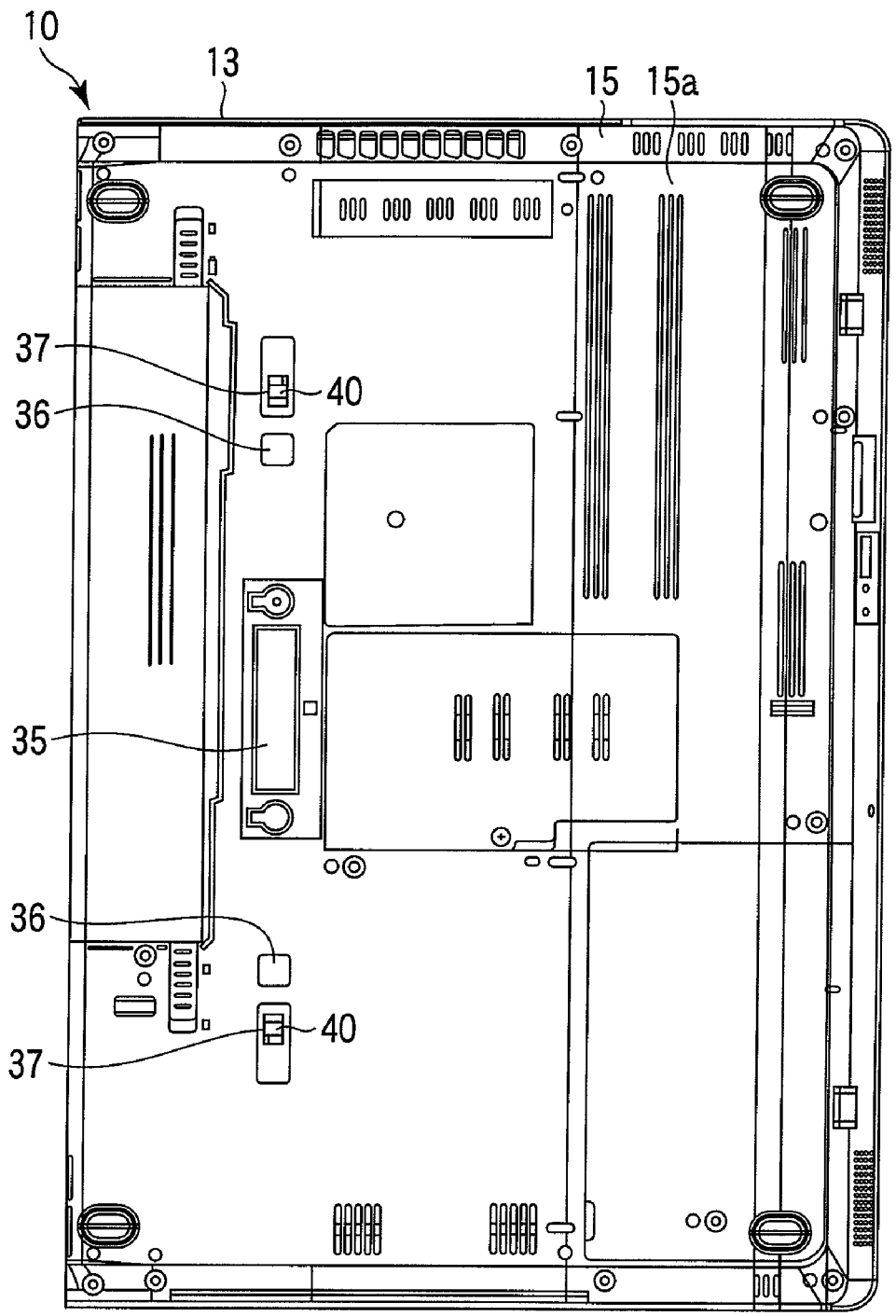
FIG. 2 is an exemplary plan view showing a bottom of the portable computer shown in FIG. 1 as viewed from below.

FIG. 2 shows a bottom of the portable computer 1 as viewed from below. As shown in FIG. 2, a bottom surface 15a of the rear cover 15 is provided with a socket 35 and a pair of projections 36. Further, the bottom surface 15a of the rear cover 15 is provided with a pair of openings 37. The openings 37 are open to the outside of the rear cover 15.

The socket 35 is provided in a position corresponding to the plug 31 of the port replicator 2. The portable computer 1 and the port replicator 2 are electrically connected by insertion of the plug 31 into the socket 35.

The pair of projections 36 are provided in positions respectively corresponding to the pair of eject pins 32. The projections 36 project outward from the rear cover 15. When the portable computer 1 is connected to the port replicator 2, the projections 36 receive the eject pins 32 of the port replicator 2.

The openings 37 are located in positions respectively corresponding to the ground electrodes 33. Ground springs 40 are exposed respectively through the openings 37. The ground spring is an example of a conductive member and has elasticity.

Figure 3:
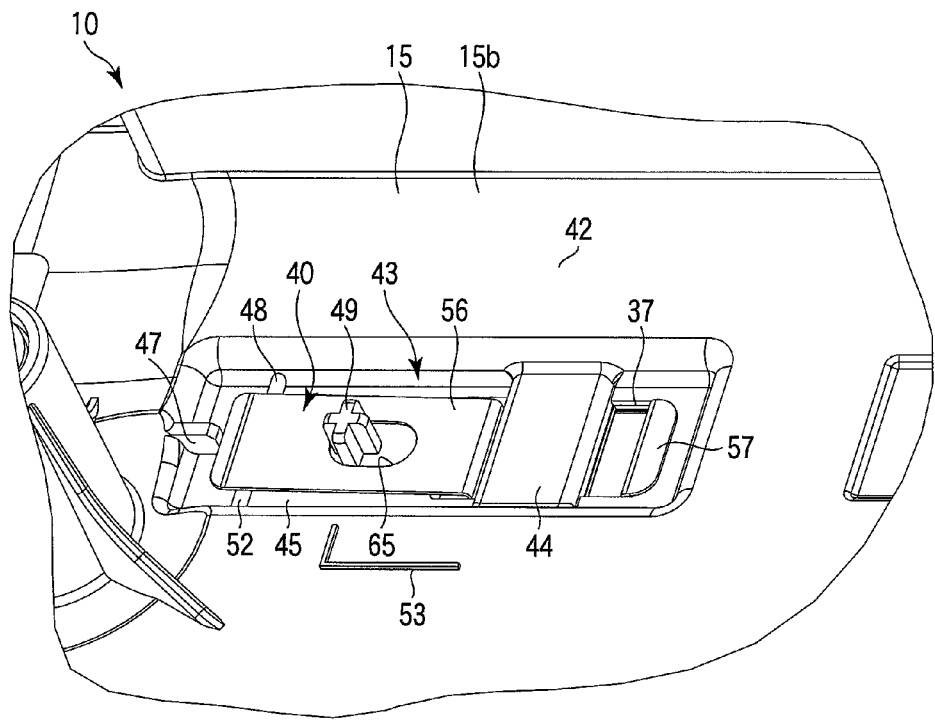
FIG. 3 is an exemplary perspective view as viewed from within the computer main body shown in FIG. 1.
Figure 4:
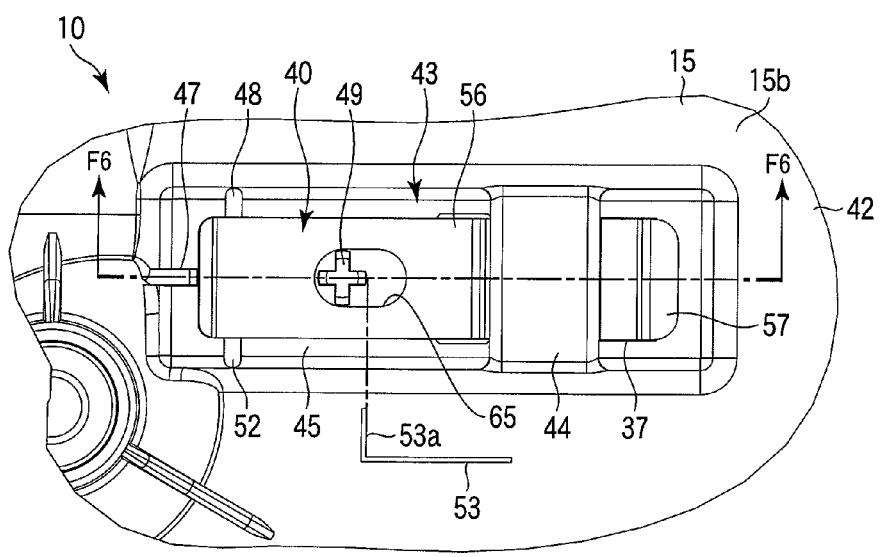
FIG. 4 is an exemplary plan view as viewed from within the computer main body shown in FIG. 1.

FIGS. 3 and 4 show the computer main body 10 from inside. As shown in FIG. 3, an inner surface 15b of the rear cover 15 is provided with a first conductive layer 42 formed of copper plating or the like.

The first conductive layer 42 prevents an electromagnetic wave generated by circuit parts or the like in the main casing 13 from passing through and leaking out of the main casing 13. Further, the first conductive layer 42 prevents an external electromagnetic wave from adversely affecting the circuit parts in the main casing 13.

The inner surface 15b of the rear cover 15 is provided with an attachment portion 43. The ground spring 40 is attached to the attachment portion 43. The attachment portion 43 is recessed from the inner surface 15b of the rear cover 15. The aforementioned opening 37 is provided in the attachment portion 43. The attachment portion 43 comprises a bridging portion 44 and a flat contact surface 45. The bridging portion 44 is an example of a part locating across opposing edge portions.

Figure 5:
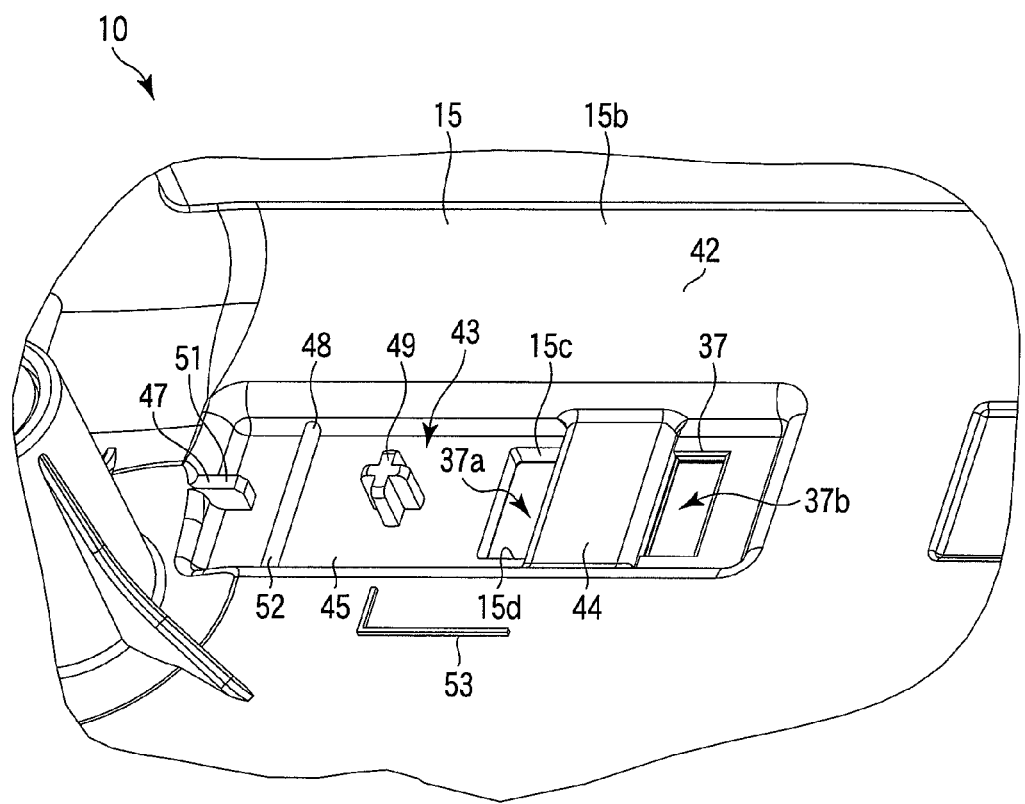
FIG. 5 is an exemplary perspective view showing an attachment portion shown in FIG. 3, from which a ground spring has been removed.

FIG. 5 shows the attachment portion 43, from which the ground spring 40 has been removed. As shown in FIG. 5, one edge 15c and the other edge 15d of the rear cover 15 define the opening 37. The other edge 15d is opposite the one edge 15c. The one edge 15c and the other edge 15d are an example of the edge portions, which define an opening and opposing each other. The bridging portion 44 bridges the one edge 15c and the other edge 15d.

Figure 6:
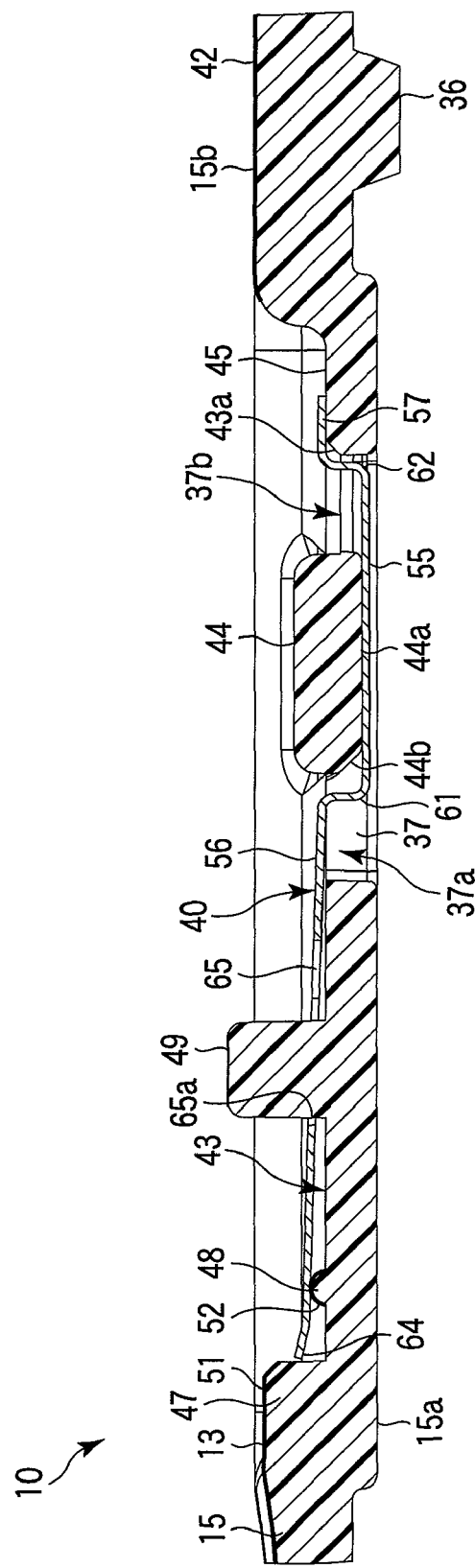
FIG. 6 is an exemplary cross-sectional view taken along the line F6-F6 in FIG. 4.

FIG. 6 shows the ground spring 40 and the attachment portion 43 along the line F6-F6 in FIG. 4. As shown in FIG. 6, the bridging portion 44 includes an outer surface 44a. The outer surface 44a is directed to the outside of the main casing 13. The outer surface 44a is provided in a position recessed from the bottom surface 15a of the rear cover 15 toward the inside of the main casing 13.

As shown in FIG. 5, the attachment portion 43 is provided with a first projecting portion 47, a second projecting portion 48 and a positioning pin 49. The positioning pin 49 is an example of a protrusion. The first projecting portion 47, the second projecting portion 48 and the positioning pin 49 project from the contact surface 45 of the attachment portion 43.

The first projecting portion 47 is located apart from the opening 37. The first projecting portion 47 includes a top portion 51 directed to the inner part of the main casing 13. The top portion 51 is flush with and continuous to the inner surface 15b of the rear cover 15. As shown in FIG. 6, the opening 37 is located between the first projecting portion 47 and the projection 36 provided on the bottom surface 15a of the rear cover 15.

As shown in FIG. 5, the second projecting portion 48 is located between the opening 37 and the first projecting portion 47. The surface of the second projecting portion 48 is covered with a second conductive layer 52. The second conductive layer 52 is continuous from the first conductive layer 42. The second conductive layer 52 is electrically connected to the first conductive layer 42.

The positioning pin 49 is located between the opening 37 and the second projecting portion 48. The shape of the positioning pin 49 is not limited to a crisscross as shown in FIG. 5. The positioning pin 49 may have any other shape, such as a cylindrical shape or prism shape.

As shown in FIG. 5, the opening 37 is divided into a first hole portion 37a and a second hole portion 37b by the bridging portion 44. The first hole portion 37a is nearer to the positioning pin 49 than the second hole portion 37b.

As shown in FIG. 6, the bridging portion 44 is provided with a first inclined portion 44b. The first inclined portion 44b is located at an edge portion of the bridging portion 44 on the side of the first hole portion 37a. The first inclined portion 44b is formed such that the first hole portion 37a broadens toward the outside of the main casing 13.

The attachment portion 43 is provided with a second inclined portion 43a. The second inclined portion 43a is located at an edge portion of the attachment portion 43 which defines the second hole portion 37b. The second inclined portion 43a is formed such that the second hole portion 37b broadens toward the inner part of the main casing 13.

As shown in FIG. 4, the inner surface 15b of the rear cover 15 is provided with a positioning rib 53. The positioning rib 53 is located near the opening 37, and projects from the inner surface 15b of the rear cover 15.

FIG. 7 is a side view of the ground spring 40. The ground spring 40 comprises an exposing portion 55, a first portion 56 and a second portion 57. The exposing portion 55 and the second portion 57, in combination, function as an example of a short part. The first portion 56 is an example of a long part.

As shown in FIG. 6, the exposing portion 55 is fit in the opening 37. The exposing portion includes a first bend 61 and a second bend 62. The first bend 61 extends across the inside and the outside of the main casing 13 through the first hole portion 37a. The second bend 62 extends across the inside and the outside of the main casing 13 through the second hole portion 37b.

The exposing portion 55 is exposed out of the main casing 13 over the outer surface of the bridging portion 44. The exposing portion 55 is in contact with the outer surface 44a of the bridging portion 44. The exposing portion 55 receives the ground electrode 33 of the port replicator 2 when the portable computer 1 is connected to the port replicator 2.

The first portion 56 extends from the first bend 61 of the exposing portion 55 toward the first projecting portion 47. The first portion 56 is substantially rectangular. The first portion 56 is longer than the exposing portion 55 plus the second portion 57.

The first portion 56 is elastically brought into contact with the second conductive layer 52 formed on the surface of the second projecting portion 48. When the first portion 56 is in contact with the second conductive layer 52, the ground spring 40 is electrically connected to the first conductive layer 42 via the second conductive layer 52.

As shown in FIG. 4, the second projecting portion 48 extends in a direction crossing the longitudinal direction of the first portion 56. Therefore, the first portion 56 is in line contact with the second conductive layer 52 formed on the surface of the second projecting portion 48.

As shown in FIG. 7, when the ground spring 40 is in a free state, in which it is removed from the attachment portion 43, the first portion 56 is bent toward the contact surface 45 of the attachment portion 43. The free state means a state in which the ground spring 40 is not deformed by external force.

The first portion 56 has a distal end portion 64. The distal end portion 64 is directed to the first projecting portion 47. The distal end portion 64 is bent in a direction away from the contact surface 45. As shown in FIG. 6, the distal end portion 64 is brought into contact with the first projecting portion 47 in a part between the top portion 51 and the contact surface 45.

As shown in FIG. 3, the first portion 56 is provided with a positioning hole 65. The positioning hole 65 is an example of a hole. The positioning hole 65 is provided in a position corresponding to the positioning pin 49 in the attachment portion 43. The positioning pin 49 is inserted through the positioning hole 65.

The positioning hole 65 is elongated in the longitudinal direction of the first portion 56. In the state where the ground spring 40 is attached to the attachment portion 43, the positioning hole 65 extends from the position of the positioning pin 49 toward the opening 37.

As shown in FIG. 6, a hole edge 65a defining the positioning hole 65 is in contact with the positioning pin 49. Accordingly, the first portion 56 is held between the first projecting portion 47 and the positioning pin 49.

The second portion 57 extends from the second bend 62 of the exposing portion 55 in the direction opposite to the first portion 56. The second portion 57 is in contact with the contact surface 45 of the attachment portion 43. In other words, as shown in FIG. 6, the second portion 57 is caught on the contact surface 45.

Figure 8:
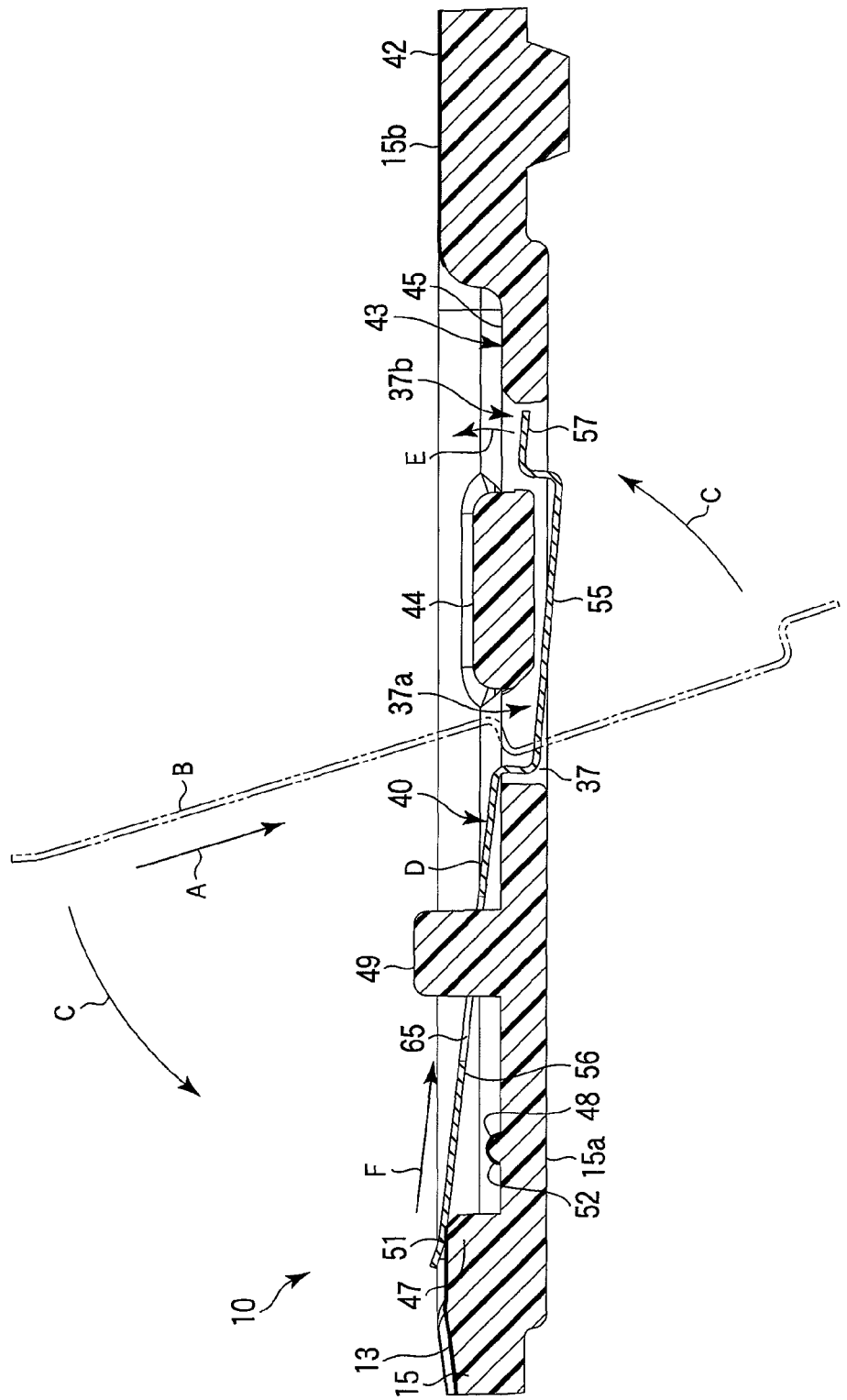
FIG. 8 is an exemplary cross-sectional view showing a process for attaching the ground spring shown in FIG. 6.

FIG. 8 shows a process for attaching the ground spring 40. The ground spring 40 is attached to the attachment portion 43, for example, in the following manner.

First, the ground spring 40 is inserted through the first hole portion 37a of the opening 37 in a direction indicated by an arrow A in FIG. 8. The arrow A represents a direction from the inner part of the main casing 13 toward the outside through the first hole portion 37a. As a result of the insertion, the exposing portion 55 and the second portion 57 of the ground spring 40 moves to a position B indicated by a two-dot chain line in FIG. 8. The position B represents a position at which the exposing portion 55 and the second portion 57 are exposed out of the main casing 13 through the first hole portion 37a.

The ground spring 40 is rotated in a direction indicate by an arrow C in FIG. 8 to a position D indicated by a solid line in FIG. 8. The arrow C represents a direction of rotation about the first hole portion 37a, and the direction in which the first portion 56 approaches the inner surface 15b of the rear cover 15 and the second portion 57 approaches the bottom surface 15a. In the position D, the positioning pin 49 is inserted in the positioning hole 65 of the first portion 56. Further, the first portion 56 is brought into contact with the top portion 51 of the first projecting portion 47.

The second portion 57 of the ground spring 40 is pushed up in a direction indicated by an arrow E in FIG. 8. At the same time, the ground spring 40 is pushed in a direction indicated by an arrow F in FIG. 8 such that the first portion 56 slides on the top portion 51 of the first projecting portion 47. The arrow E represents a direction from the outside of the main casing 13 toward the inside through the second hole portion 37b of the opening 37. The arrow F represents a direction from the top portion 51 of the first projecting portion 47 toward the first hole portion 37a.

When the ground spring 40 is pushed in the direction of the arrow F while the second portion 57 is pushed up in the direction of the arrow E, the second portion 57 is caught on the contact surface 45 of the attachment portion 43. At the same time, the first portion 56 is brought into contact with the second projecting portion 48 by elastic force. As a result, the ground spring 40 is attached to the attachment portion 43 as shown in FIG. 6.

When the ground spring 40 is to be detached, the distal end portion 64 of the first portion 56 is picked up by, for example, a pair of tweezers, and pulled in the direction opposite to the arrow F in FIG. 8. Accordingly, the first portion 56 is brought on the first projecting portion 47 and the second portion 57 is displaced out of the main casing 13 through the second hole portion 37b. In other words, the ground spring 40 is moved to the position D shown in FIG. 8 and removed from the attachment portion 43.

In the portable computer 1 having the configuration described above, the ground spring 40 is attached to the attachment portion 43 through the process described above. Thus, the ground spring 40 can be easily attached to the attachment portion 43 without secondary working, such as screwing or welding.

Furthermore, the ground spring 40 can be detached from the attachment portion 43 without unscrewing or cutting of the welded portion. Thus, the ground spring 40 can be easily detached from the attachment portion 43.

When the ground spring 40 is attached to the attachment portion 43, the first portion 56 is elastically brought into contact with the second conductive layer 52 formed on the surface of the second projecting portion 48 and the exposing portion 55 is brought into contact with the outer surface 44a of the bridging portion 44. Further, the positioning pin 49 is inserted in the positioning hole 65, so that the first portion 56 is held by the first projecting portion 47 and the positioning pin 49. As a result, the ground spring 40 is firmly attached to the attachment portion 43.

The first portion 56 is bent toward the contact surface 45 of the attachment portion 43 in the free state. Therefore, the first portion 56 is brought into firm contact with the second conductive layer 52 formed on the surface of the second projecting portion 48.

The distal end portion 64 of the first portion 56 is bent in a direction away from the contact surface 45. Therefore, when the ground spring 40 is detached from the attachment portion 43, the distal end portion 64 can be easily picked up by a pair of tweezers or the like. Further, when the ground spring 40 is attached to the attachment portion 43, the distal end portion 64 can easily slide on the top portion 51 of the first projecting portion 47.

The first portion 56 is in line contact with the second conductive layer 52 formed on the surface of the second projecting portion 48. Therefore, the first portion 56 can be in stable contact with the second conductive layer 52. Accordingly, the electric connection between the ground spring 40 and the first conductive layer 42 can also be stable.

The bridging portion 44 is provided with the first inclined portion 44b and the attachment portion 43 is provided with the second inclined portion 43a. Because of the inclined portions, the ground spring 40 can be easily inserted through the first hole 37a of the opening 37 and the second portion 57 can be easily caught on the contact surface 45 of the attachment portion 43.

The portable computer 1 provided with the ground spring 40 has been described above. However, in the case of a portable computer having a main casing that is the same in shape as the main casing 13 but is not adapted for the port replicator 2, the ground spring 40 may not be attached to the attachment portion 43. In this case, a blindfold sheet 68 may be stuck on the inner surface 15b of the rear cover 15.

Figure 9:
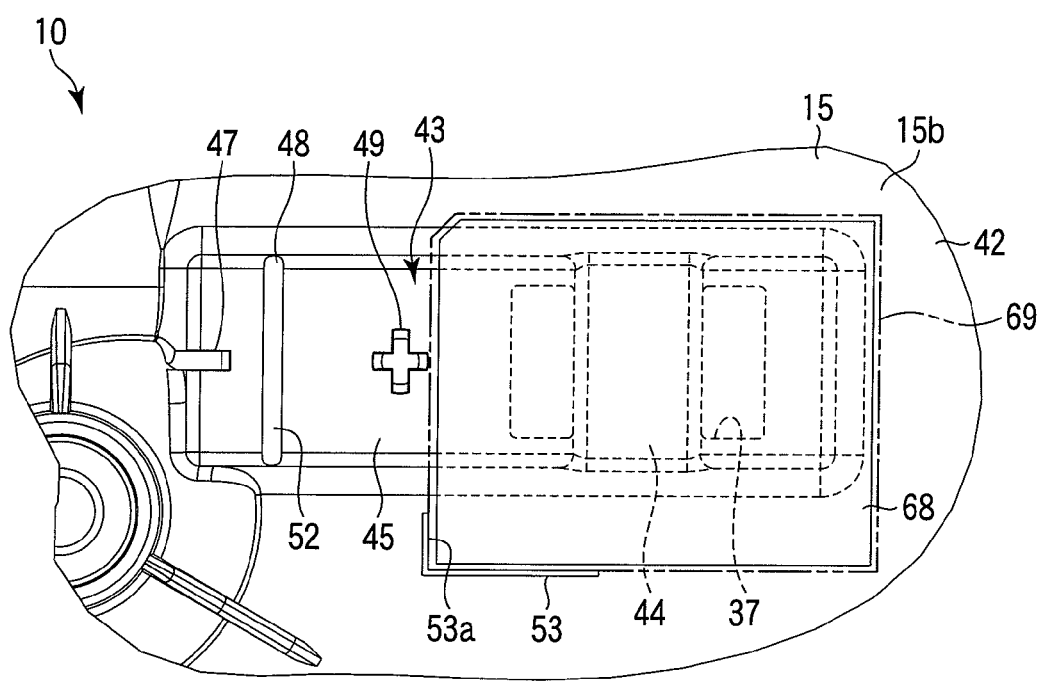
FIG. 9 is an exemplary plan view showing a state in which a sheet has been stuck on an inner surface of a rear cover shown in FIG. 4.

FIG. 9 shows the inner surface 15b of the rear cover 15 on which the sheet 68 is stuck. As shown in FIG. 9, a sticking area 69 is defined on the inner surface 15b of the rear cover 15. The sticking area 69 is determined to be surrounding the opening 37.

The positioning rib 53 has a guide surface 53a which faces the sticking area 69. As shown in FIG. 4, the guide surface 53a and the periphery of the positioning pin 49 are located in one line. As shown in FIG. 9, the guide surface 53a and the positioning pin 49, in combination, define an edge of the sticking area 69.

The sheet 68 is stuck on the sticking area 69. More specifically, the sheet 68 is stuck on the inner surface 15b of the rear cover 15 by, for example, a double-faced tape. As a result, the sheet 68 covers the opening 37 from inside of the rear cover 15.

If the ground spring 40 is unnecessary, the interior of the main casing 13 can be concealed by sticking the sheet 68 on the sticking area 69. Furthermore, since the periphery of the positioning pin 49 is located on an extended line from the guide surface 53a, the positioning pin 49 can be used for positioning the sheet 68.

The present invention is not limited to the embodiment described above, but may be modified variously without departing from the spirit of the invention. For example, in the above embodiment, the ground spring 40 is attached to the attachment portion 43 by holding the first portion 56 with the first projecting portion 47 and the positioning pin 49. However, the ground spring 40 may be attached to the attachment portion 43 by another way, for example, bringing the second bend 62 of the exposing portion 55 into contact with the edge that defines the opening 37.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a casing having a wall on which inner surface is provided a first conductive portion;
an attachment portion provided on the wall and comprising a first opening and a second opening opened to an outside of the casing;
a first projecting portion projecting on an inside of the casing;

a second projecting portion being located between the first opening and the first projecting portion and projecting on the inside of the casing, the second projecting portion provided with a second conductive portion electrically connected to the first conductive portion; and a conductive member attached to the attachment portion through an outside of the casing and having elasticity, the conductive member comprising:
- an exposing portion exposed to an outside of the casing;
- a first portion inserted in the first opening and being elastically brought into contact with the second conductive portion of the second projecting portion; and
- a second portion inserted in the second opening.

2. An electronic apparatus comprising:
- a casing provided with a first opening and a second opening and comprising a first conductive portion on an inner surface thereof;
- a conductive member comprising a first portion inserted in the first opening, a second portion inserted in the second opening, and a third portion located outside the casing and between the first portion and the second portion;
- a first projecting portion projecting on an inside of the casing and being brought into contact with the first portion; and
- a second projecting portion projecting on the inside of the casing at a different location from that of the first projecting portion, comprising a second conductive portion which is electrically connected to the first conductive portion, and being elastically brought into contact with the first portion.

3. The electronic apparatus of claim 2, wherein the first portion of the conductive member is provided with a hole, and an inner surface of the casing comprises a protrusion inserted through the hole.

4. The electronic apparatus of claim 3, wherein the hole has a long hole shape extending along the longitudinal direction of the first portion of the conductive member.

5. The electronic apparatus of claim 2, wherein the first portion of the conductive member inclines in a direction different from the direction in which the second portion extends.

6. The electronic apparatus of claim 2, wherein the first portion of the conductive member has a distal end portion directed to the first projecting portion; and the distal end portion is bent in a direction away from the first opening.

7. The electronic apparatus of claim 6, wherein the first projecting portion has a top portion directed to an inner portion of the casing; and the distal end portion of the first portion is brought into contact with the first projecting portion between the top portion and the casing.

8. An electronic apparatus comprising:
- a casing provided with a first opening and a second opening and comprising a conductive portion on an inner surface thereof;
- a conductive member comprising a first portion inserted from the first opening to an inside of the casing, a second portion inserted from the second opening to an inside of the casing, and a third portion located outside the casing and between the first portion and the second portion; and
- a projecting portion projecting on an inside of the casing and being elastically brought into contact with the first portion.

9. The electronic apparatus of claim 8, wherein the first portion of the conductive member is provided with a hole; and an inner surface of the casing comprises a protrusion inserted through the hole.

10. The electronic apparatus of claim 8, wherein the first portion of the conductive member inclines in a direction different from the direction in which the second portion extends.

* * * * *